United States Patent
Neumann (10) Patent No.: US 10,349,485 B2
(45) Date of Patent: Jul. 9, 2019

(54) EFFICIENT CONTROL ASSEMBLY AND CONTROL METHOD

(71) Applicant: Inova Semiconductors GmbH, München (DE)

(72) Inventor: Roland Neumann, München (DE)

(73) Assignee: Inova Semiconductors GmbH, München (DE)

( * ) Notice: Subject to any disclaimer, the term of this patent is extended or adjusted under 35 U.S.C. 154(b) by 0 days.

(21) Appl. No.: 16/079,380

(22) PCT Filed: Jan. 26, 2017

(86) PCT No.: PCT/EP2017/000091
§ 371 (c)(1),
(2) Date: Aug. 23, 2018

(87) PCT Pub. No.: WO2017/162323
PCT Pub. Date: Sep. 28, 2017

(65) Prior Publication Data
US 2019/0053339 A1    Feb. 14, 2019

(30) Foreign Application Priority Data
Mar. 21, 2016   (DE) .......... 10 2016 105 264

(51) Int. Cl.
H05B 37/02    (2006.01)
H05B 33/08    (2006.01)
H04L 12/403   (2006.01)

(52) U.S. Cl.
CPC ......... *H05B 33/086* (2013.01); *H04L 12/403* (2013.01); *H05B 37/0254* (2013.01)

(58) Field of Classification Search
CPC ...... H05B 33/08; H05B 33/086; H05B 37/02; H05B 37/0254; H05B 37/0272; H05B 37/038; H04L 12/403
See application file for complete search history.

(56) References Cited

U.S. PATENT DOCUMENTS

| 8,492,983 B1 | 7/2013 | Berg et al. | |
| 2002/0047628 A1* | 4/2002 | Morgan | G09G 3/14 315/291 |

(Continued)

FOREIGN PATENT DOCUMENTS

| DE | 10352286 | 6/2005 |
| WO | WO-2017162323 | 9/2017 |

OTHER PUBLICATIONS

"International Application No. PCT/EP2017/000091, International Preliminary Report on Patentability dated Feb. 19, 2018", (Feb. 19, 2018), 20 pgs.

(Continued)

*Primary Examiner* — Thai Pham
(74) *Attorney, Agent, or Firm* — Schwegman Lundberg & Woessner, P.A.

(57) ABSTRACT

The present invention is directed to a control assembly comprising control units connected in series along with a respective control method, which allow for the provision of a particularly efficient data transfer, in particular for light-emitting diode control units. The present invention is also directed to a respective protocol causing control units to carry out the respective method steps.

12 Claims, 9 Drawing Sheets

(56) References Cited

U.S. PATENT DOCUMENTS

| | | | | |
|---|---|---|---|---|
| 2005/0201305 A1* | 9/2005 | Shibata | .................... | H04L 5/16 |
| | | | | 370/282 |
| 2005/0264973 A1* | 12/2005 | Gardner | ................ | H04B 3/548 |
| | | | | 361/169.1 |
| 2009/0021955 A1 | 1/2009 | Kuang et al. | | |
| 2012/0323394 A1* | 12/2012 | Gandhi | .............. | H05B 33/0857 |
| | | | | 700/297 |
| 2014/0333207 A1* | 11/2014 | Saes | .................... | H04L 12/417 |
| | | | | 315/132 |

OTHER PUBLICATIONS

"International Application No. PCT/EP2017/000091, International Search Report and Written Opinion dated Apr. 24, 2017", (Apr. 24, 2017), 13 pgs.

* cited by examiner

| instr | dev adr | data | | |
|---|---|---|---|---|
| | | 0 0 : Broadcast  0 1 - 7 F : Device Adresses | | |
| Test Mode | | | | |
| Test Number | 0 0 0 0 1 | x x | | |
| | | 0 0 0 0 0 0 0 0 : | Measure all what could be measured | Select Source and Trigger Measurement and store results in reult map for subsequent read |
| | | 0 0 0 0 0 0 0 1 : | Measure reference voltage 1 (5V Supply) | |
| | | 0 0 0 0 0 0 1 0 : | Measure reference voltage 2 (Programming voltage pin) | |
| | | 0 0 0 0 0 0 1 1 : | Measure RED LED Vf | |
| | | 0 0 0 0 0 1 0 0 : | Measure Green LED Vf | |
| | | 0 0 0 0 0 1 0 1 : | Measure Blue LED Vf | |
| | | 0 0 0 0 0 1 1 0 : | Measure SMP CLK toggeling | |
| | | 0 0 0 0 0 1 1 1 : | Measure Pulse CLK toggeling | |
| | | 0 0 0 0 1 0 0 0 : | Measure BIAS voltage | |
| Calibration Mode | | | | |
| Select / Mode | 0 0 0 1 0 | x x | | |
| | | 0 - b b b : | LED Select: 001b-red; 010-green; 100-blue | Set On Current (No Store to OTP) |
| | | 1 0 b b b : | LED Select: 001b-red; 010-green; 100-blue | Set&Store On Current |
| Test *Parameter* | | - b .. b : | 10 Bit constant current value of selected LED | |
| | | 1 1 b b b : | LED Select: 001b-red; 010-green; 100-blue | Set&Store increment for Temp Comp |
| | | - b .. b : | 7 Bit increment for constant current value of selected LED | |
| RGB Mode | | | | |
| RGB Value | 0 0 1 0 0 | x x | | |
| | | x x x x x x : | Set the RGB value of the selected device(s) | Set RGB Value |
| Read Request | | | | |
| Select Read Target | 0 1 0 0 0 | - - | | |
| only allowed on last subframe position | | 0 0 1 | Read temperature values of all devices | Read Temp |
| | | 0 1 0 | Read status values of all devices (dev adr, uv,..) | Read Status |
| | | 1 | Diagnostic Read *(Values needs to be measured before w. Test Mode)* | Read Test Results |
| | | 1 0 0 0 | Read reference voltage 1 | Read Re. Volt1 |
| | | 1 0 | Read reference voltage 2 | Read Ref. Volt2 |
| | | 1 1 | Read BIAS voltage | Read BIAS |
| | | 1 1 0 0 | Read red led Vf (9bit) | Read Red LED El.Par |
| | | 1 1 0 1 | Read green led Vf (9bit) | Read Green LED El.Par |
| | | 1 1 1 0 | Read blue led Vf (9bit) | Read Blue LED El.Par |
| No Operation | 0 0 0 0 0 | x | | |
| | | x x x x x x : | Nop to complete D_MASTERFRAME or to fill-up befor read request | NOP Dummy  This is not IDLE! |

| MLED SIO RL Code | |
| --- | --- |
| 0000 | 00100 |
| 0001 | 01001 |
| 0010 | 10100 |
| 0011 | 01010 |
| 0100 | 10001 |
| 0101 | 01011 |
| 0110 | 01110 |
| 0111 | 11001 |
| 1000 | 10010 |
| 1001 | 10011 |
| 1010 | 10110 |
| 1011 | 01101 |
| 1100 | 11010 |
| 1101 | 11011 |
| 1110 | 11100 |
| 1111 | 11101 |
| Quiet | 00000 |
| Idle | 11111 |
| | |
| StartD_Frame | 10101 |

* Any sequence with more than 5x1 is idle

EFFICIENT CONTROL ASSEMBLY AND CONTROL METHOD

PRIORITY CLAIM TO RELATED APPLICATIONS

This application is a U.S. national stage filing under 35 U.S.C. § 371 from International Application No. PCT/EP2017/000091, filed on 26 Jan. 2017, and published as WO2017/162323 on 28 Sep. 2017, which claims the benefit under 35 U.S.C. 119 to German Application No. 10 2016 105 264.7, filed on 21 Mar. 2016, the benefit of priority of each of which is claimed herein, and which applications and publication are hereby incorporated herein by reference in their entirety.

The present invention is directed to a control assembly comprising control units connected in series along with a respective control method which allows for the provision of a particularly efficient data transfer, in particular for light-emitting diode control units. The present invention is also directed to a respective protocol causing control units to carry out the respective method steps. Therefore, the control protocol initiates a transfer of control signals between the control units. Furthermore, a computer program product is proposed, which comprises control commands for execution of the method or the protocol and which provides the control commands to a computer for their execution.

U.S. 2014/0333207 A1 shows a lighting arrangement with light-emitting diodes, which are arranged in series according to the known Daisy-Chaining-approach thereby exchanging status information.

U.S. Pat. No. 8,492,983 B1 shows a system for controlling light-emitting diodes using a serial bus. In this respect receiving of an address field and changing an address field is suggested.

U.S. 2009/0021955 A1 shows a vehicle with a lighting arrangement with light-emitting diodes with a respective controlling thereof.

US 2005/0201305 A1 shows an apparatus and a method for transmitting data.

According to known methods, run-length encodings and communication protocols for data transfer between computer units are proposed. Thus, for example, internet protocols are known, which provide for a computer network by means of several server units. Here, respective components are to be provided, which components comprise extensive computing capacities and memory. Such communication networks are typically operated in such away that a communication on a data line in one direction triggers a response in the opposite direction.

In this respect, handshake protocols are known, which, for example, negotiate the establishing of a connection and carry a series of requests and responses for this purpose. Thus, according to the known prior art, typically no unidirectional communication is carried out, but with a data exchange from a first unit to a second unit, data is also transferred from the second unit to the first unit. Thus, in conventional methods, a backward channel is always reserved, which can effect a band width reduction on the forward channel.

Hereto, it is necessary to configure the communicating units in a way such that the differing data signals have to be processed in a forward direction as well as in a backward direction.

According to commonly known methods, a plurality of possibilities for addressing serially connected control units is known. Here, generic approaches, which approaches can be disadvantageous for specific application scenarios, or also very particular approaches exist, which approaches are no longer applicable in a generic manner. As an example, the so called CAN-Bus is known, which has been developed in regard to wiring harnesses and which specifically is meant to implement a network of control devices. The CAN-Bus provides a large number of components and requires a plurality of safety mechanisms which secure that no transmission error occurs. Furthermore, a plurality of data transmissions is necessary for securing the data integrity. Therefore, a number of measures is adopted which, in turn, demand computing resources and bandwidth.

Further, the so called LIN-Bus, i.e. Local Interconnect Network Bus is known, which also has been developed for serial communication systems and specifically for cross linking of sensors and control units. With the LIN-Bus, a generic approach has been implemented, which is usually is not applied for broadband application scenarios. Moreover, according to the LIN-Bus, a comprehensive error management also has to be carried out. For example, checksums are calculated and signals identified to be erroneous are dismissed. In this case, signaling an error is not part of the protocol but must be defined in a further application layer, if necessary.

Furthermore, a series of communication protocols is known, which initiate data transmission in a communication network. Here, usually a central unit is formed, which regulates the data traffic. However, this prior art does not provide for a serial connection of a plurality of further control units, such that these serially connected control units do not assume communication management but merely implement received commands. It is an advantage of serially connected control units that they do not have to control the coordination of network communication but can receive the same control commands from a control unit, have to merely implement these control commands and can pass them on.

Thus, methods and devices are known, which typically require performant hardware and can still operate with a reduced bandwidth. Since incoming data packages are structured differently from outgoing data packages, a respectively more complicated hardware is to be provided. In particular, in accordance with the prior art, it is disadvantageous that a backward channel must be provided for a communication process, which returns a response to the sending unit. Also, according to known computing units, several connected units are typically operated in parallel, which makes it necessary in a computing unit to not only coordinate forward and backward directions but also to operate a plurality of communication partners. Here, it is typical that outgoing and incoming data packages differ from each other in a way such that conventional units need to be able to handle different data formats or data frames.

Thus, it is an object of the present invention to provide an assembly of control units or a respective control method which allows the use of particularly lean components, i.e. technically less complex components, but also makes a secure data transfer along with maximum bandwidth possible. Furthermore, it is an object of the present invention to provide a respective computer program product comprising control commands which initiate the inventive method.

Said object is achieved by the features of claim 1. Further advantageous developments are defined in the dependent claims.

Accordingly, a control assembly comprising serially connected control units is proposed, wherein each of the control units comprises a first communication interface configured for communication with a further control unit, and a second communication interface suitable for communication with a further control unit. According to the present invention, the control units are configured such that control signals are transmitted from the first communication interface to the second communication interface exclusively, or from the second communication interface to the first communication interface.

Here, according to the present invention, it is particularly advantageous that there is never a simultaneous bidirectional transmission during the transmission of control signals. In case a transmission direction is defined between the first communication interface and the second communication interface, sending is always carried out in the same transmission direction while data transfer. Thus, it does not occur at any time that a communication direction from the first communication interface to the second communication interface as well as a communication direction from the second communication interface to the first communication interface is required. Accordingly, the inventive control assembly is not solely configured in a way such that there is always sending in the same communication direction but it is rather an advantage of the present invention that it is actually possible to send in both communication directions, which, however, takes place on a time-delayed basis.

Thus, the inventive control unit which is employed in the control assembly is configured in a way such that it sends from the first communication interface to the second communication interface, but, at the same time, is also configured to send in the opposite communication direction. Here, the expression "exclusively, or" does not define an alternative structural design of the control units forming the basis of the control assembly. In fact it is rather referred to the fact that the control units can communication in both directions, which, however, they can never do simultaneously.

With the expression "control signals", it is described that it does not concern an atomic signal but that a plurality of control signals is exchanged constantly in one direction. This fact is particularly advantageous since the plurality of control signals is transmitted solely in one communication direction. This excludes that an atomic request is sent in one communication direction and that a response is sent in the opposite direction. In fact, provision is made in accordance with the present invention such that first control signals are sent in a first communication direction, i.e. from the first communication interface to the second communication interface, and that, afterwards, i.e. time-delayed, a second plurality of control signals is sent from the second communication interface to the first communication interface, i.e. in a second communication direction. Thus, it is an inventive feature that the control units are configured in a way such that, with transmitting connected control signals, they do not simultaneously initiate a further transmission of further control signals in the opposite direction. The person skilled in the art recognizes that an atomic signal and respectively an atomic request forms a single control signal and respectively a single request.

This is particularly advantageous since, thus, an exclusive processing of one communication direction is possible. Therefore, for known servers, it is not provided for one computing unit to operate constantly several communication directions and, thus, to process or send requests and responses, but a wireless transmission of control signals is carried out. Thus, the presently discussed control assembly implies that when a communication is processed in one communication direction, the respective other communication direction is blocked. Thus, with little technical effort, a plurality of control units is provided, which, according to the present invention, are not supposed to provide computing capacity for several communication directions and which can exclusively use the respective data lines. Thus, according to the present invention, there is no need for distinguishing between a gross bandwidth and a net bandwidth since the full gross bandwidth is available all the time. Therefore, no overhead and no return transmission of control signals are generated such that the technical possible maximum bandwidth of a communication channel is always available.

According to the present invention, a control assembly is proposed. The control units are connected in series in a way such that one control unit comprises one or maximally two communication partners, wherein it is also possible that only one communication partner is present at the end of the series. Also, the series of control units can be coupled to further control units. Typically, the control units connected in series are present in direct connection, respectively. This means that, typically, no intermediate units are interposed in the series. It is only possible at the beginning of a series to provide a command unit. Said command unit can also be referred to as master, while the further control units connected in series are each referred to as slave.

The communication interfaces are configured accordingly. Since each control unit typically comprises two communication neighbors, a first communication interface is provided by a first neighbor, and a second communication interface is provide by a second neighbor. Here, the first communication interface is always used and is, thus, configured for communication with a further control unit. While the second communication interface can also be configured for communication with a further control unit, it is at least suitable for communication with a further control unit. This describes the case in which the communication interface figuratively runs into nothing, since no further control unit is connected. Thus, typically, both communication interfaces are configured in order to communicate with further control units, since the control units typically comprise two communication neighbors. Here, however, the case is not to be excluded that the control unit is installed at the end of the series, wherein the second communication interface at the end of the series is, thus, merely suitable for communication with a further control unit. This is particularly advantageous since all control units are typically designed in the same manner. Thus, there is no need to differ between control units installed within the series and control units installed at the end of the series.

The transmission of control signals from the first communication interface to the second communication interface is typically a passing-through of control commands through the control unit. Thus, control signals are received by a communication interface, which are either processed or passed-through directly to the second communication interface. It is also possible that control signals are received and processed, and passed-on immediately after the receipt. Thus, there is no need to wait for the result of the execution of the control commands, but the control commands or control signals can be processed within the control unit, while they have already been passed-on to a further control unit. Thus, an efficient passing-on of the control signals is also possible, since no time delay of the processing of the control signals has to be accepted.

The use of the communication interfaces implies one communication direction in total with the control assembly. Thus, the features of the communication direction within the control units also apply to the data line segments connecting the control units. That way, the data line segments connecting the control units are also used exclusively, since it is possible to implement the communication direction on several control units. Thus, the underlying transmission of control signals in a first control unit can cause a receiving of the control signals, a setting of a communication direction and a passing-on of the control commands. Here, a setting of a communication direction implies that, with the input of data from a first communication partner, the output for said communication partner is blocked, unless it is the last control unit of the series. In fact, after the passing-on of the received control signals, a receipt of these control signals is initiated in a further control unit. Thus, a transmission of control signals from a first control unit to a second control unit causes a blocking of the underlying backward direction.

Only at the last control unit connected in series, after the receiving of the control signals, the backward direction is unblocked and an execution result of the control signals is returned. Now, the direction of the series of the further control units connected in series is again inverted, and a result is again received from the previously outputting communication interface, for example in form of control signals, and these are returned to the previously sending control units. Thus, in accordance with the invention, a sending of control commands or control signals in a forward and a backward direction at a given point of time by single control units is prevented. Therefore, according to the present invention, it is also not necessary that the control units must hold computing capacities, i.e. circuits and memory, which have to handle both communication directions. Rather, an exclusive access to the control unit within one communication direction always takes place. Since this one communication direction always prevails, it is not necessary in accordance with the present invention to reserve a back channel on the data line between the control units. Accordingly, compared to conventional methods, fewer performant control units can be used, which, however, exploit the full bandwidth of the communication channel.

According to an aspect of the present invention, a first signal transmission from the first communication interface to the second communication interface takes place, and a second signal transmission from the second communication interface to the first communication interface takes place. This always takes place in a time-delayed manner. This provides the advantage that the control unit has to handle both communication directions at no point of time of a control signal transmission. It is rather an advantage of the present invention that merely resources for one communication direction must be provided, even though both communication directions can be handled.

According to another aspect of the present invention, the control signal transmission transmits a plurality of control commands. This provides the advantage that no atomic signals are simply transmitted but, in fact, a plurality of control commands can be sent from a control unit to the next control unit in an uninterrupted manner, i.e. without responses. Also, the control commands can be transmitted within the control units from an ingoing communication interface to an outgoing communication interface. Thus, even within a transmission of a plurality of control commands, an exclusive access to the control unit always takes place.

According to yet another aspect of the present invention, the control units are at least substantially designed identical. This provides the advantage that the control units can be provided with little technical effort, since uniform control units always can be used in the series. Thus, it cannot be distinguished if a control unit is installed within a series or at the end or the beginning of the series. Here, it is also possible that the control units are not only substantially designed identical, but are actually designed identical to each other.

According to yet another aspect of the present invention, the control units identify exactly one signaling format. This provides the advantage that the signaling format, also referred to as header, is designed in each communication direction in an identical manner, whether it being within the control units or in between the control units. Thus, if a control unit receives signaling data from a further control unit, said control unit is also configured to use the same signaling format when transmitting the control signals. Therefore, within the entire control assembly, i.e. within the control units connected in series, a uniform signaling format is used. This is particularly advantageous since it is not the case that a first signaling format is used for one communication direction and a second signaling format is used for a second communication direction. This fact, again, makes it possible to provide the control units with little technical effort, since they are only required to be able to identify one single signaling format. Identifying, in this context, means an interpretation of the signaling format.

According to yet another aspect of the present invention, in accordance with the signaling format, a distinct signal sequence for pulse determination is provided. This has the advantage that, even with different local pulses of the single control units, a uniform pulsing can be generated implicitly based on the control commands. This is the case since the control commands can comprise a predetermined signal sequence which notifies the respective control unit that payload is transmitted after the received signal sequence. Thus, the data signals received on the communication line can be interpreted, without providing a central unit for adjusting a pulse. In fact, the control units comprise features which receive communication signals on the data line. Now, in case the predefined signal sequence is received, it is determined independently of further measures that the subsequent signals are to be interpreted as a transmission frame or as data. That way, further technical means which provide the control units with a respective pulse, are saved. Here, it is particularly advantageous to choose a distinct signal sequence, since it can be excluded that payload comprises the same signal sequence and, thus, initiates a new pulse.

According to yet another aspect of the present invention, the signaling format does not provide further address information. This provides the advantage that the address can be provided implicitly by the control units connected in series, by means of controlling a respective communication interface. Thus, it is not necessary to specify the communication receive a data transmission. This is always the communication partner which shares a communication line with the sending control unit. In particular, according to the present invention, it is especially advantageous that no bandwidth for address information is lost.

According to yet another aspect of the present invention, the control units identify a variable size of payload. This provides the advantage that no predefined format must be complied with. It is rather possible to distinguish the header data from the payload in that a distinct signal sequence is received as header data and, subsequently, payload is received. Payload is received as long as the control units again receive a further distinct signal sequence which again initiates new payload.

According to yet another aspect of the present invention, the control units establish an exclusive communication direction between the two communication interfaces based on the control signals. Here, it is also possible that the control units specify an exclusive communication direction on the adjacent data lines based on the control signals. Thus, after the receipt of control signals, said data line is no longer monitored by a control unit within the series, but is merely unblocked again in case data is received on the other communication interface. That way, the control signals establish an exclusive communication direction within the control units as well as between the control units.

According to the present invention, the communication lines communicate at any time of a control signal transmission unidirectional in pairs with each other. This provides the advantage that the control units can not only be switched exclusively to one communication direction within them, in between two communication interfaces, but, also, one communication direction is rather adjustable between the control units.

According to yet another aspect of the present invention, the control units control light-emitting diodes. This provides the advantage that specifically for light-emitting diodes connected in series, a fast control of these light-emitting diodes is possible and, thus, a particularly pleasing luminosity behavior can be adjusted. The control assembly according to the present invention is especially advantageous particularly for the reason that the light-emitting diodes must be controllable with little technical effort and respective diagnosis possibilities must be given. Thus, according to the present invention, it is possible to transmit diagnosis commands in a particularly efficient manner to the control units of the light-emitting diodes, and to return a respective diagnosis result in a particular efficient manner. That way, according to the present invention, a control assembly is proposed, which also enables a diagnosis of light-emitting diodes. Here, a diagnosis of light-emitting diodes can require further sensors. Thus, according to the present invention, light-emitting diodes operated at running time can also be efficiently controlled in dependence of a diagnosis result.

According to yet another aspect of the present invention, the control signals comprise a color value of a light-emitting diode. This provides the advantage that so-called multi-color light-emitting diodes can also be used. Accordingly, it is possible, for example, to adjust the emitted wavelength of the light-emitting diode based on a RGB-value in such a way that a specific color is generated.

The present object is also achieved by a control method for control units connected in series, wherein each of the control units comprises a first communication interface configured for communication with a further control unit, and a second communication interface suitable for communication with a further control unit. The control signals are transmitted from the first communication interface to the second communication interface exclusively, or, i.e. either or, transmitted from the second communication interface to the first communication interface. Thus, the present method excludes that control units transmit control signals to two communication partners at the same time. In particular, the control units can transmit control commands to each of the two communication partners. This, however, takes place on a time-delayed basis.

According to an aspect of the present invention, a method step for blocking a communication direction between both communication interfaces is provided. This also refers to a blocking of a communication direction between two control units. Thus, according to the present invention, it is ensured that precisely one exclusive communication direction is implemented, and that it is not sent to two communication partners, respectively.

The present object is also achieved by a computer program product comprising control commands which are configured for execution of a proposed method. It is particularly advantageous to provide the computer program product as a protocol. Thereby, the single protocol steps in the method according to the present invention are specified, and the computer program product stores these control commands for use as a protocol. Furthermore, it is advantageous that the control assembly according to the present invention can be controlled by means of the described method. In particular, these control units or the control assembly can be operated by means of the method. Analogously thereto, the control units or the control assembly can be used for processing the method. Thus, it is particularly advantageous that all features of the control assembly, of the control units connected in series, of the method as well as of the computer program product can be combined in a way such that the advantage according to the present invention presents itself.

Thus, a control assembly together with a respective control method is proposed, which makes it possible to reach particularly efficient hardware utilization and, thereby, utilize the maximum bandwidth. Since the underlying hardware always has to handle one communication direction, this can be implemented in a simple manner, which, again, results in a reduced proneness to error. Furthermore, respective components can be designed in a smaller manner, exhibit less heat build-up and require less power compared to known components.

Further advantageous implementations are described in the following based on the attached figures. It is shown in:

FIG. 5: a schematic illustration of a communication frame comprising control signals according to an aspect of the present invention;

Figure 1:
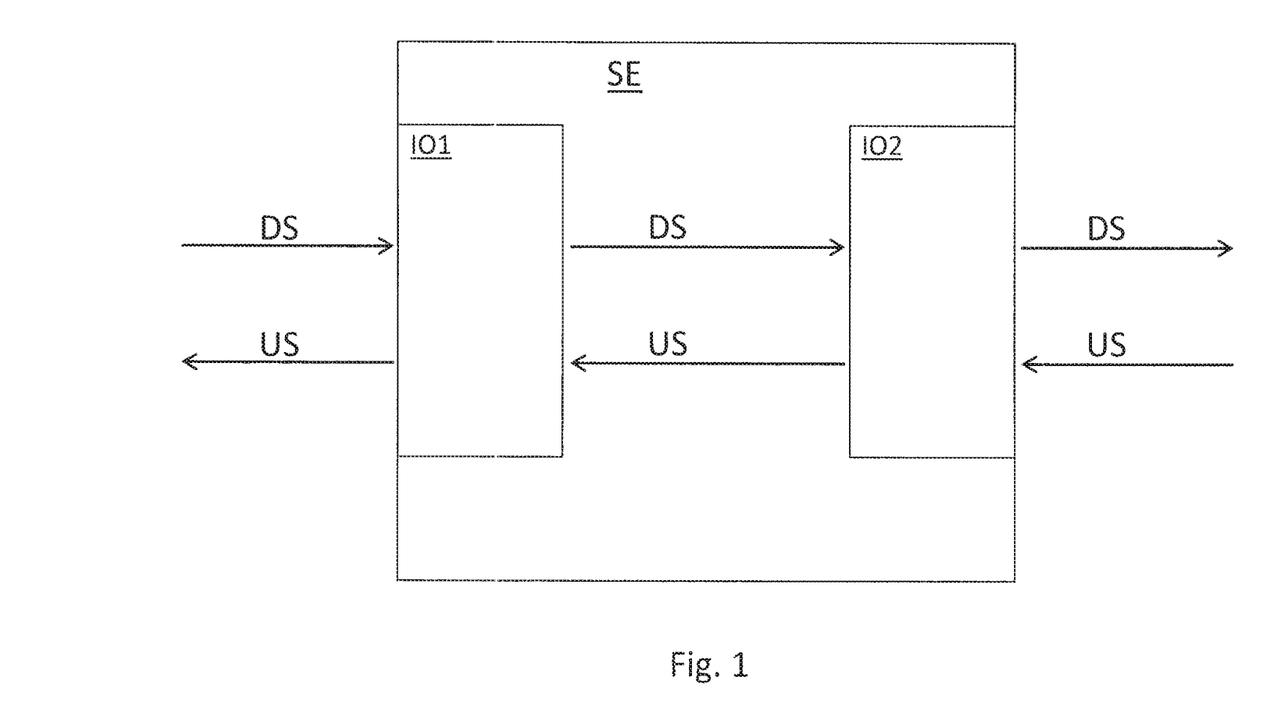
FIG. 1: a schematic block diagram of the control unit according to the present invention, together with the respective communication interfaces.

FIG. 1 shows a control unit SE which is configured for communication in a first communication direction DS, and which is further configured for communication in a second communication direction US. Here, the first communication direction can be a downstream communication direction DS, and the second communication direction can be an upstream communication direction US. According to the present invention, it is possible to connect the control units in series in such a way that they are logically connected in pairs, respectively, by means of a single data line segment. Thus, according to the presently discussed FIG. 1, solely one logical communication is delineated by means of the two arrows DS and US. As can be gathered from FIG. 1, the control unit SE can be adjusted in regard to its communication direction. This is carried out in accordance with the present invention by merely setting the downstream direction DS or the upstream direction US.

The previous can be carried out, for example, by means of the respective communication interfaces IO1 or IO2. Thereby, in case the control unit SE receives data in the downstream direction, it is possible that the communication interface IO1 is adjusted in a way such that no further data is received in said downstream direction. Only if signaling data, i.e. header data, is again received via the upstream direction US, the data line segment presently arranged on the left is unblocked again and a return transmission in the upstream direction US occurs. That way, it is possible to adjust a communication direction by means of the communication interfaces IO1 and IO2 based on the received control commands.

In this case, the communication interfaces IO1, IO2 are input/output interfaces. They are potentially suitable for sending in both directions, i.e. for receiving data as well as sending data. The communication interfaces can each be referred to as bidirectional communication interfaces. Thus, there is no directed interface unit present. Alternatively, the respective communication interface can also be implemented in a way such that the same provides a unit for input and a unit for output of data. Therefore, two unidirectional communication interfaces are present.

Furthermore, it is possible to adjust the communication direction within the control unit SE, depending on the received control signal, i.e. depends on a receipt of a direction command or, also, header data. Thus, both communication interfaces IO1 and IO2 are adjusted in a way such that they only monitor or write on the respective left or right data line segment.

In this regard, monitoring refers to a waiting for signals or to a reading of signals on the data line. Thus, after a receipt of control commands on the left data line segment, the same data line segment is temporarily blocked in a way such that it is only unblocked when receiving header data coming from the upstream direction US. Thus, in case the left data line segment receives a header or control signals, the right data line segment DS is unblocked and the control signals can be transmitted.

The internal communication within the control unit SE behaves analogous thereto. So, for example, the communication direction can be adjusted in a way such that, after a receipt on the respective interface, a communication direction within the control unit can be blocked or unblocked. For example, if the upstream direction US is blocked, the inner transmission of the control signals can also be blocked together with the external data line segments. Thus, for a number of control signals, one direction is always blocked and another, opposite direction is unblocked. Therefore, the control signals comprise a respective direction switch information, also referred to as signaling data, INIT data, header data or INIT frame. This data is specified based on a provided signaling format and can comprise a distinct signal sequence for pulse determination.

Figure 2:
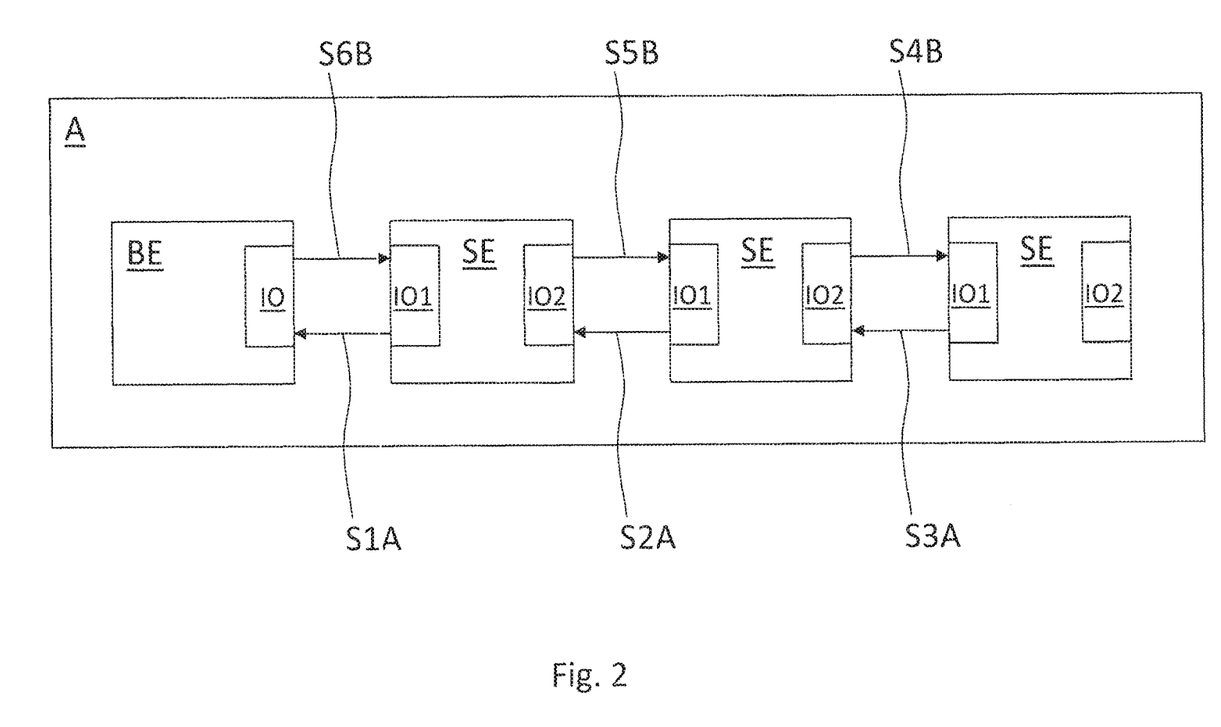
FIG. 2: a schematic block diagram of a control assembly with serially connected control units according to an aspect of the present invention.

FIG. 2 shows the inventive control assembly A comprising several serially connected control units SE. Here, with the same reference sign for the control units SE, it is clarified that they are always designed identical. Also, from the presently discussed FIG. 2, it can be gathered that, for example, the last of the serially connected control units, presently the control unit on the right side, comprises a first communication interface IO1 which is actually configured for communication with the left control unit, and a second communication interface IO2 which might be generally suitable for communication with a further control unit, but which, however, is not used. Thus, all control units comprise two communication neighbors or communication partners, except for the last control unit which comprises only the left communication partner. Nonetheless, according to the present invention, it is possible to provide for a further central control unit or command unit BE which is referred to as master. In this case, all other control units SE are referred to as slave.

In order to clarify the unidirectional communication direction, data line segments connecting the control units in pairs have been delineated in the form of two logically separated arrows. That way, the data line segments S1A and S6B can be implemented as one single data line. The respective arrows are directed in accordance with their communication direction. Thus, according to the present invention, it is possible to use each one of the single control units in one communication direction to the right at first, and, after the arrival of the control signals on the right side, to invert the communication direction in a way such that the same, in turn, is switched to the left. That way, all control units SE are each configured to communicate in both directions, wherein this procedure, however, always happens in a timely delayed manner. Thus, it is not possible that the right interface IO2 of a control unit communicates with the interface IO1 simultaneously as per the data line segments S2A and S5B at a given time unit or point in time.

Accordingly, a control unit does not pass-on control signals simultaneously from the communication interface IO1 to the communication interface IO2 in both directions. A transmission from the communication interface IO1 to the communication interface IO2 always happens without a simultaneous return of data from the communication interface IO2 to the communication interface IO1. Thus, according to the present invention, it is particularly advantageous that the underlying communication direction is also adjustable within the control unit SE. Accordingly, hardware resources are only to be provided for one communication direction.

With regard to the communication interfaces IO1, IO2 in regard of FIGS. 1 and 2, by choice of the reference signs IO1, IO2, no communication direction is given. The communication direction can occur from IO1 to IO2, or from IO2 to IO1. Thus, depending on the communication direction, the first communication interface can be referred to with IO1, or the second communication interface can be referred to with IO1. Analogously, the first communication interface can be referred to with IO2 or the second communication interface can be referred to with IO2. For example, a communication direction shown in FIGS. 1 and 2 as a communication direction from the right to the left is the communication direction from the communication interface IO1 to the communication interface IO2, and the communication direction from the left to the right is the communication direction from the communication interface IO2 to the communication interface IO1. The communication direction respectively refers to a communication direction within the control units SE or the communication direction in between control units SE arranged in pairs.

Figure 3:
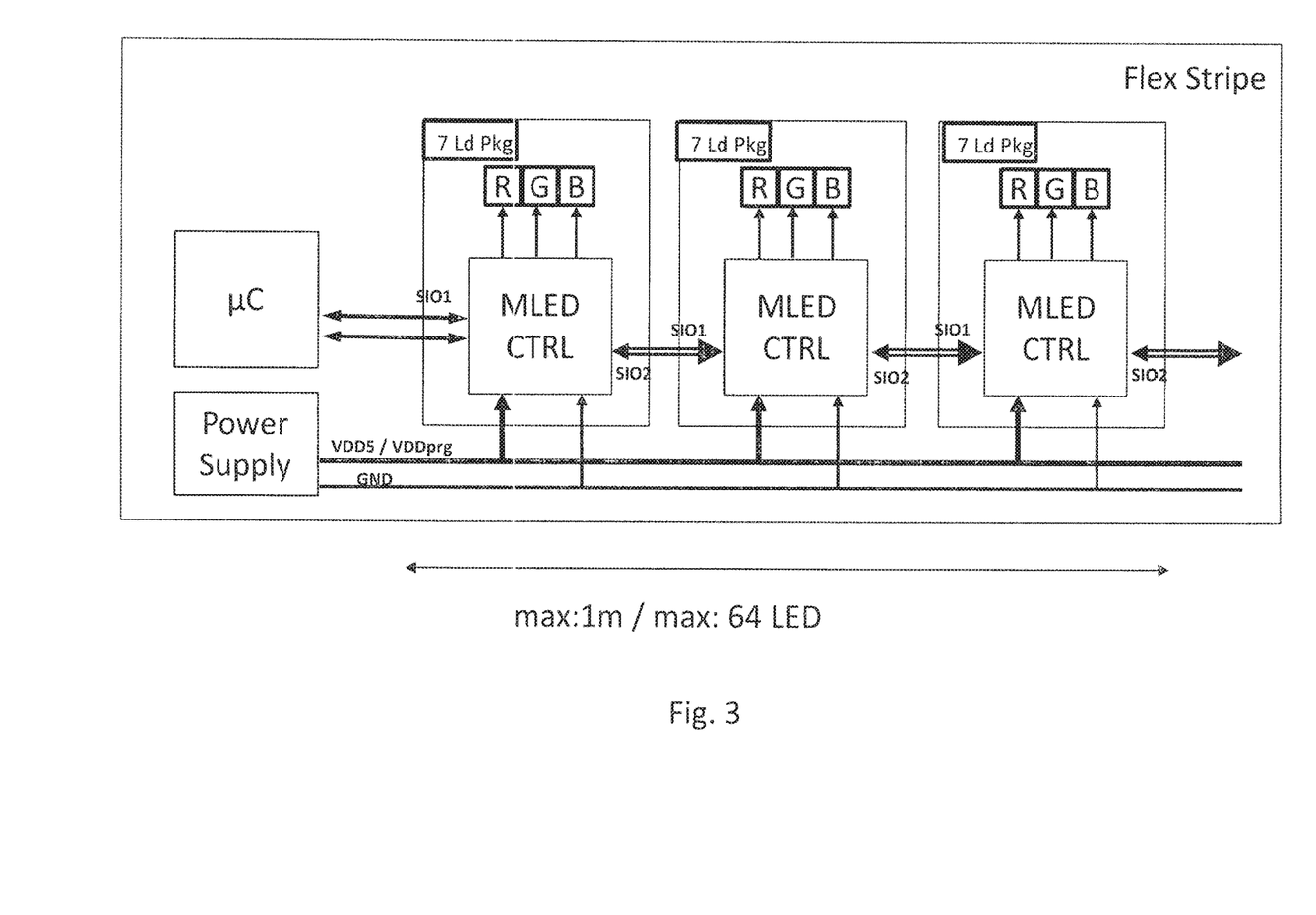
FIG. 3: a schematic block diagram of a control assembly according to a further aspect of the present invention.

FIG. 3 shows an aspect of the present invention, according to which the control units SE are designed as control units for light-emitting diodes. Thus, the control units SE are presently referred to with MLED CTRL. Here, according to the present invention, it is particularly advantageous that existing hardware components can be re-used and only the MLED CTRL must be exchanged in accordance with the present invention.

So, on hand, the command unit BE is shown on the left side as a microcontroller, which is connected to three control units. Since the three control units are connected in series, the command unit is directly connected to one control unit and is indirectly connected to the further control units. The control units can be so called multi-LED controller. This is marked in presently discussed FIG. 3 as MLED CTRL. By the uniform use of this reference sign, it should be clarified that the control units are typically designed identical. As is presently evident, the light-emitting diodes are RGB (i.e. red, green, blue) light-emitting diodes. Here, these are configured to adjust one certain color value by means of a mixing ratio of the single light-emitting diode units. Furthermore, it can be gathered from the presently discussed figure that further components are to be provided, if necessary. For example, it can be necessary to provide a power supply. Here, however, it is also possible to externally provide these components, such as a power supply, and merely connect the same.

In the present case, the data line exists as plurality of data line segments which are delineated in the form of bidirectional arrows SIO1, SIO2.

FIG. 3 shows a control unit SE according to an aspect of the present invention. A control unit SE can also comprise further components. In particular, it can be a control unit which is configured analogous to the control device MLED CTRL. So, single light-emitting diode units R, G, B are provided in FIG. 3, which schematically exist as one single light-emitting diode LED. The same emit either red, green or blue light, respectively, and adjust a specific mixing ratio of these colors in a way such that any desired color can be generated by means of this LED. Adjusting the color values can be achieved, for example, by pulse width modulation. Therefore, further components such as an On/Off modulator (not shown) are to be provided. Further components are known to the skilled practitioner, which are to be provided, such as a LED driver (not shown). In particular, conventional components can be used. For this reason, a description thereof is omitted. Here, it is particularly advantageous that the method according to the present invention typically can be initiated by means of conventional components, wherein the same must only be adapted in a way such that they can carry out the single method steps.

Figure 4:
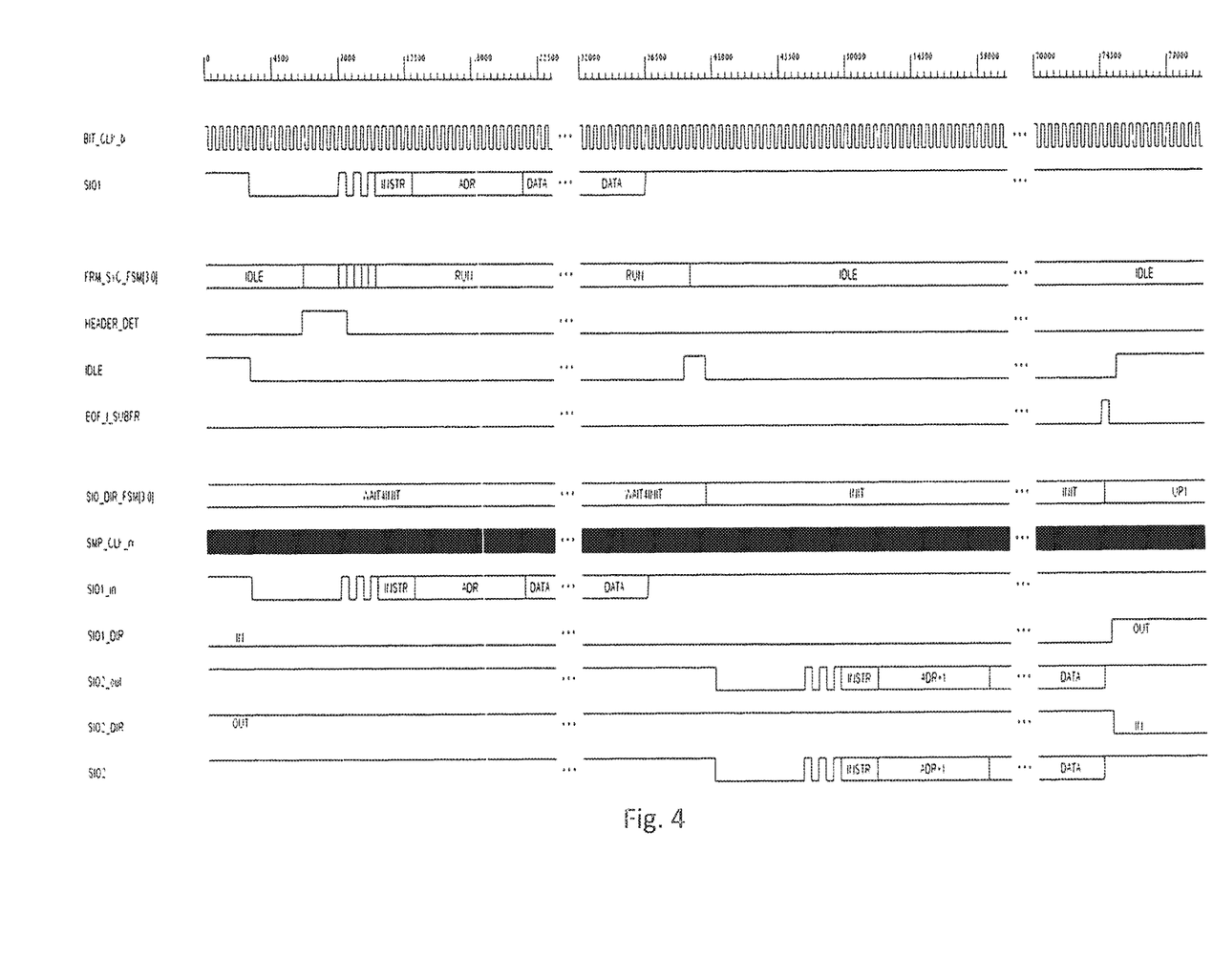
FIG. 4: a schematic illustration of a transmission of control signals in compliance with a signaling format according to an aspect of the present invention.

FIG. 4 shows a transmitted signal sequence with control signals according to an aspect of the present invention. Presently, a signal sequence according to a given signaling format is shown, which is received on a data line segment. According to this aspect of the present invention, an individual address is assigned to each control unit or Smart-LED-driver. This happens in such a way, that the address information is locally stored in the control unit SE and, subsequently, incremented. Thereby, a new control signal is generated, which contains the incremental address and transmits the same to the respective next communication partner. This control unit further comprises header information which allows the respective next control unit SE to carry out a pulse synchronization. Thus, a dynamic assignment of addresses occurs. It is further shown in the presently discussed figure how a predetermined number of control signals is transmitted. Also, it can be gathered that the respective control units can switch over to a so-called IDLE-mode in which they can neither receive nor send control signals.

FIG. 5 shows the structure of control signals according to an aspect of the present invention. This can be applied, for example, with the assembly as shown in FIG. 2, wherein the shown control signals are transmitted from the left to the right. As can be gathered from FIG. 5, the control signals are a data frame which contains instructions, an address and payload. Thus, for each instruction, a signal sequence is assigned, as can be gathered presently on the left side. Thus, when receiving such a control signal, the respective control unit obtains information about the command it is supposed to execute. By means of the so-called dev_adr, a numbering of serially connected control units occurs. Thereby, as has already been described with reference to FIG. 4, it is possible to increment the respective address value and to forward the same to the next control unit. Here, as can be gathered clearly from the presently discussed figure, it can be determined that the respective address is encoded as hex-code, which is presently marked with an "x", or that this field is not to be interpreted, which is presently marked with an "-". Furthermore, the control signal can comprise payload, which is presently identified as "data". Such payload can be an RGB value, as is shown under the header "RGB Mode". Thus, the payload comprises a color value for color adjustment of a light-emitting diode. As is shown on the lower end of the presently discussed FIG. 5, it can be identified by an instruction code, here "00000", that no operation is supposed to be carried out.

Figure 6:
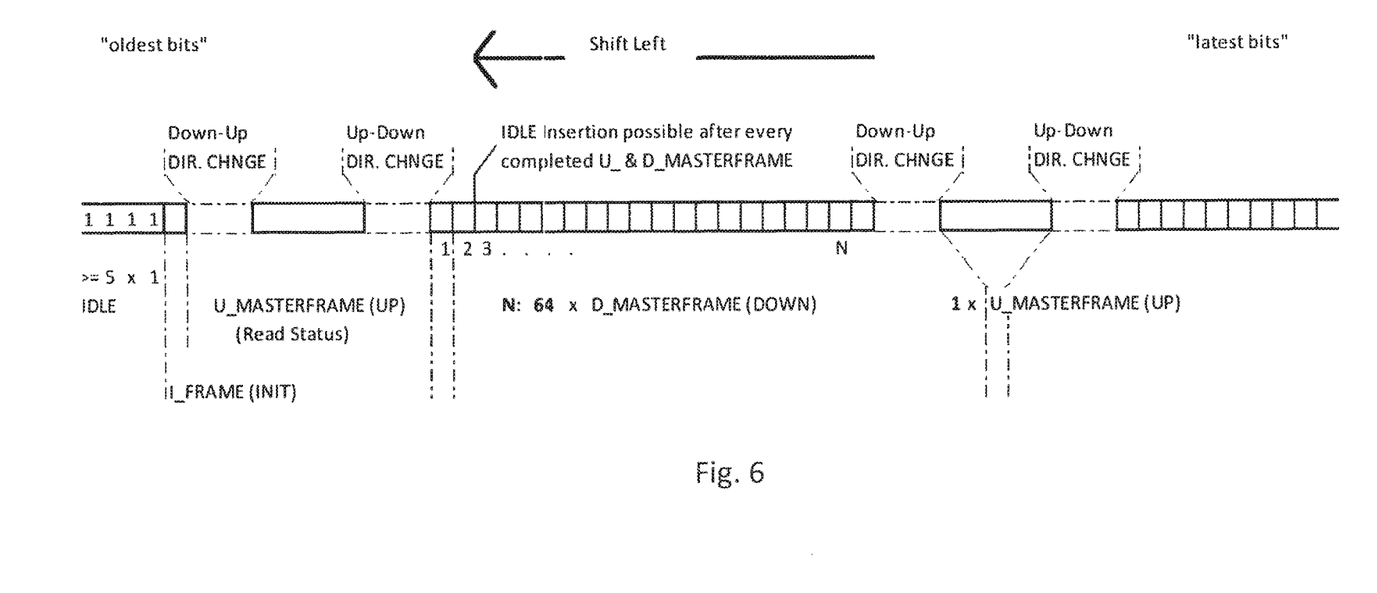
FIG. 6: a serial communication frame comprising control signals according to a further aspect of the present invention.

FIG. 6 also shows an aspect of a control signal, as is used in accordance with the present invention. As can be gathered from the presently discussed FIG. 6, the control signal comprises several control commands. On the left side, it can be gathered that an encoding of five times of a set bit, i.e. "11111" describes a so-called IDLE-mode. For this purpose, the respective signal sequence comprises five times of a "1", which also means that several set flags >5 can be used. The fifth set bit is particularly advantageous in the presently discussed figure. The same is added as a fifth field to the four shown IDLE-bits, meaning the four first fields. This field comprises further signaling data, as can be gathered exemplary from FIG. 7.

Figure 7:
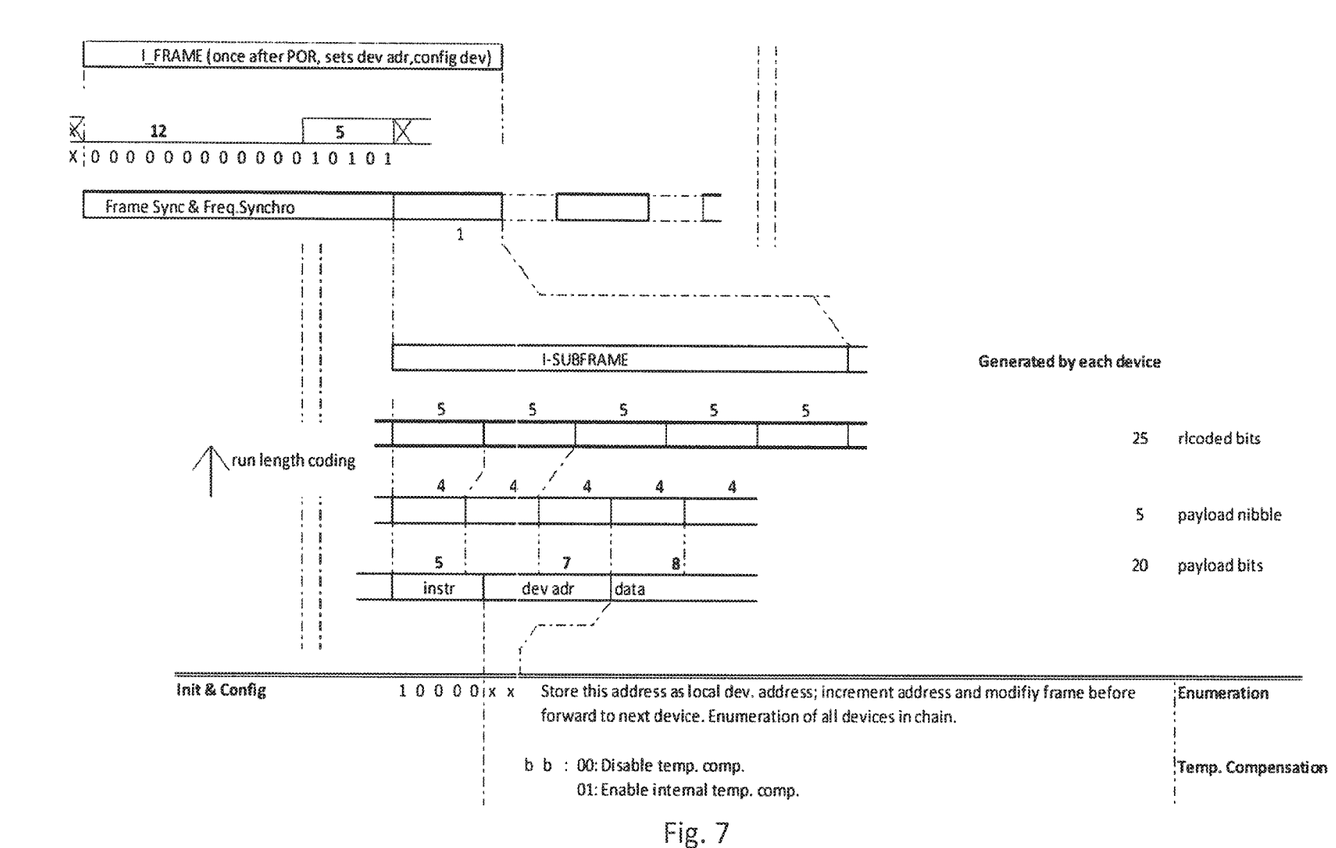
FIG. 7: a serial communication frame comprising control signals according to a further aspect of the present invention.

FIG. 7 shows on its upper side an enlarged view of the field as described in connection with FIG. 6. As can be gathered from FIG. 7, a signal sequence with five bits is provided, which correspond to a signaling format according to the present invention. Here, the signal sequence "10101" is shown in FIG. 7 on the upper side, under the respective number "5" of bits. This distinct signal sequence shows that payload is transmitted next. Thus, according to the present invention, each of the control units receiving such a code or such a signal sequence switches the direction and decodes the subsequently arriving payload. The signal sequence "10101" is a distinct signal sequence which can be used, for example, for pulse determination.

Figure 8:
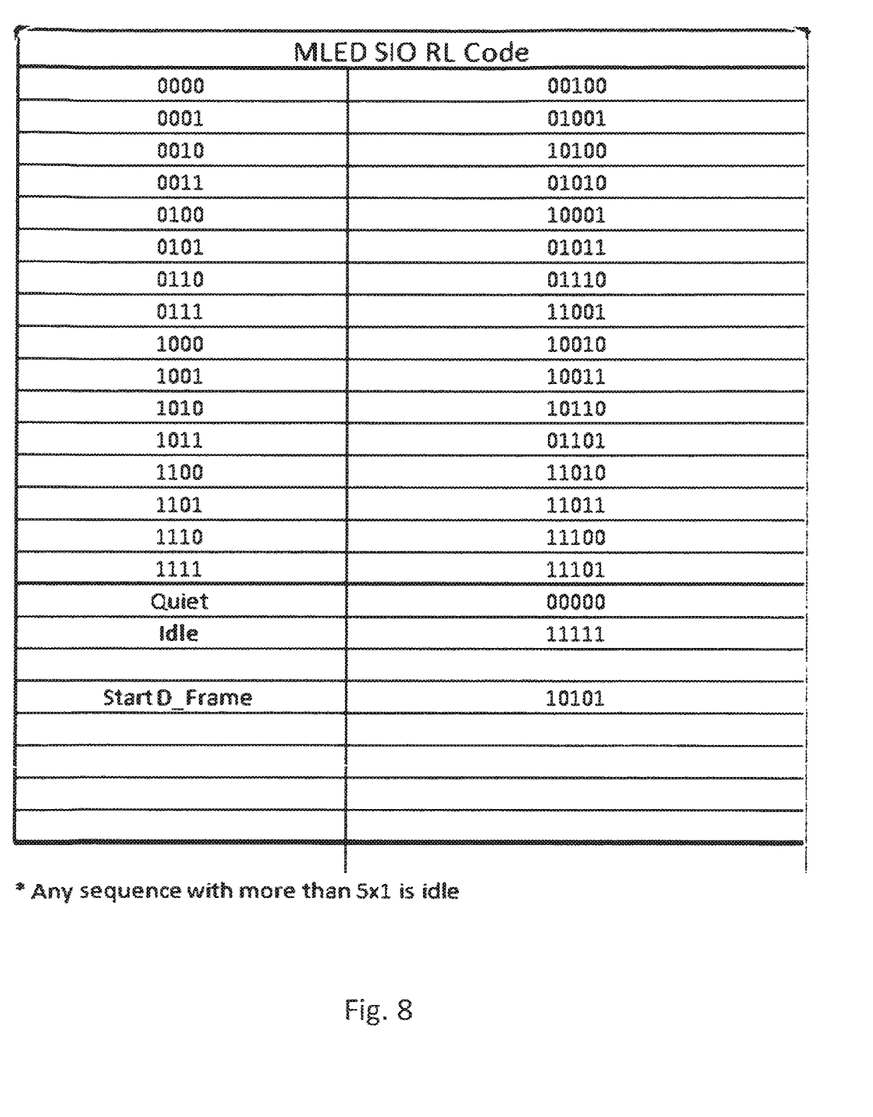
FIG. 8: a schematic illustration of a distinct signal sequence for pulse determination according to an aspect of the present invention.

A provision of a certain signal sequence, which is distinct, is shown in FIG. 8. Hereto, FIG. 8 shows a table which shows, on the left side, a semantic or logical sequence of numbers, and, on the right side, the respective bit code. As sketched on the lower end of FIG. 8, the signal sequence "10101" is the technically transmitted value which stands for the beginning of payload. Thus, each control unit identifying this code on a data line segment can assume that payload is transmitted next. As can also be gathered from the presently discussed table, according to the present invention, the code "11111" is an idling cycle code which sets the control units to be inactive. Only if the code "10101" is received again, the respective communication direction is unblocked and payload is received. As can be gathered from the right side of the presently discussed table, line ups of the signal sequences are also not suitable to generate the sequence of five times "0" or the sequence of five times "1". Thus, according to the present invention, it is possible to provide a distinct signal sequence which encodes respective semantics. According to an aspect of the present invention, the control units can dispose of such a table and, thus, can interpret the respective command code.

Figure 9:
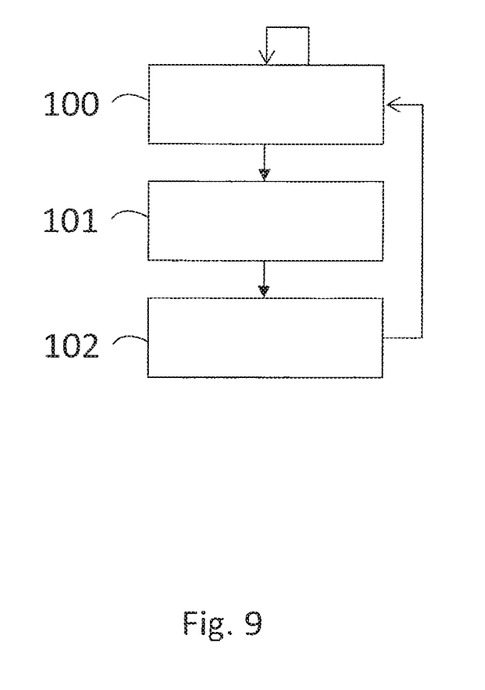
FIG. 9: a flow chart of a control method for serially connected control units according to an aspect of the present invention.

FIG. 9 shows the inventive control method for serially connected control units. Here, in a first method step 100, a receipt of control signals occurs on one of the two communication interfaces. Thereby, it is iteratively checked if the received signals are control signals which cause a change of communication direction. If this is not the case, the information is then passed-on and not processed at all. Respective control signals have been described with reference to FIGS. 4 to 8. In case header information is received in method step 100, a blocking of the presently used communication direction or an unblocking of the previously blocked communication direction can occur in a subsequent method step 101. Thus, a change of direction occurs in method step 101, as has already been described in the above. Next, in a further method step 102, a passing-on of the received control signals, for example in adapted form, can occur. Here, it is particularly advantageous that the receipt 100 and the output of data 102 always occurs in the same communication direction. The only exception is the last serially connected control unit which receives data 100 and, in case respective information exists, changes the direction 101, but which, however, typically does not send information according to method step 102 immediately, but changes the direction at first and sends then.

It is particularly advantageous that the method steps 100, 101 and 102 are processed in an iterative manner in a way such that, in the control units, a receipt of data occurs, it is then checked if a change in direction is contained in the control commands and, if so, the direction is to be changed and data is to be sent, or in case no change of direction can be identified, the communication direction is maintained. With reference to the presently discussed FIG. 2, it can be decided in method step 101 if a change of direction from left to right should be effected to the direction from right to left, or if the communication direction to the left should be maintained or if the communication direction to the right should be maintained. Thus, the method step 100 is iteratively processed until change information is available in the respective control unit.

Thus, according to the present invention, a particularly efficient control method or control assembly is proposed, which enables a particularly efficient control of, for example, light-emitting diodes. Here, in particular, it is advantageous that a respective protocol can be provided as a computer program product. Further, the present invention is directed to single control units as shown, for example, with reference to FIG. 1.

The invention claimed is:

1. A control assembly comprising serially connected control units, which control light emitting diodes, wherein each of the control units comprises:
a first communication interface configured for communication with a further control unit, and
a second communication interface suitable for communication with a further control unit,
wherein the control units are configured such that control signals are transmitted from the first communication interface to the second communication interface exclusively, or from the second communication interface to the first communication interface,
wherein the control signal transmission transmits a plurality of control commands and the control units communicate at any time of a control signal transmission unidirectional in pairs with each other by means of communication lines,
wherein the control signals are a data frame which contains instructions, an address and payload, wherein each instruction indicates a command to be executed by the receiving control unit, the payload comprises a color value for color adjustment of the light-emitting diode and the address provides a numbering of the control units, and each of the control units receiving such an instruction switches the direction and decodes the subsequently arriving payload.

2. The control assembly according to claim 1, wherein a first signal transmission from the first communication interface to the second communication interface takes place, and a second signal transmission from the second communication interface to the first communication interface takes place, which takes place in a time-delayed manner, respectively.

3. The control assembly according to claim 1, wherein the control units are at least substantially designed identical.

4. The control assembly according to claim 1, wherein the control units are configured to identify exactly one signaling format.

5. The control assembly according to claim 1, wherein, in accordance with a signaling format, a distinct signal sequence for pulse determination is provided.

6. The control assembly according to claim 1, wherein a signaling format does not provide further address information.

7. The control assembly according to claim 1, wherein the control units identify a variable size of payload.

8. The control assembly according to claim 1, wherein the control units are configured to establish an exclusive communication direction between the two communication interfaces based on the control signals.

9. A control method for control units connected in series, wherein each of the control units comprises:
a first communication interface configured for communication with a further control unit, and
a second communication interface suitable for communication with a further control unit,
wherein the control signals are transmitted from the first communication interface to the second communication interface exclusively, or, i.e. either or, transmitted from the second communication interface to the first communication interface,
wherein the control signal transmission transmits a plurality of control commands and the control units communicate at any time of a control signal transmission unidirectional in pairs with each other by means of communication lines,
wherein the control signals are a data frame which contains instructions, an address and payload, wherein each instruction indicates a command to be executed by the receiving control unit, the payload comprises a color value for color adjustment of the light-emitting diode and the address provides a numbering of the control units, and each of the control units receiving such an instruction switches the direction and decodes the subsequently arriving payload.

10. The control method according to claim 9, wherein a method step for blocking a communication direction between both communication interfaces is provided.

11. A computer program product comprising control commands configured for execution of a method according to claim 9 when being executed on a control assembly.

12. A computer program product comprising control commands configured for execution of a method according to claim 10 when being executed on a control assembly.

* * * * *